Patented Dec. 15, 1931

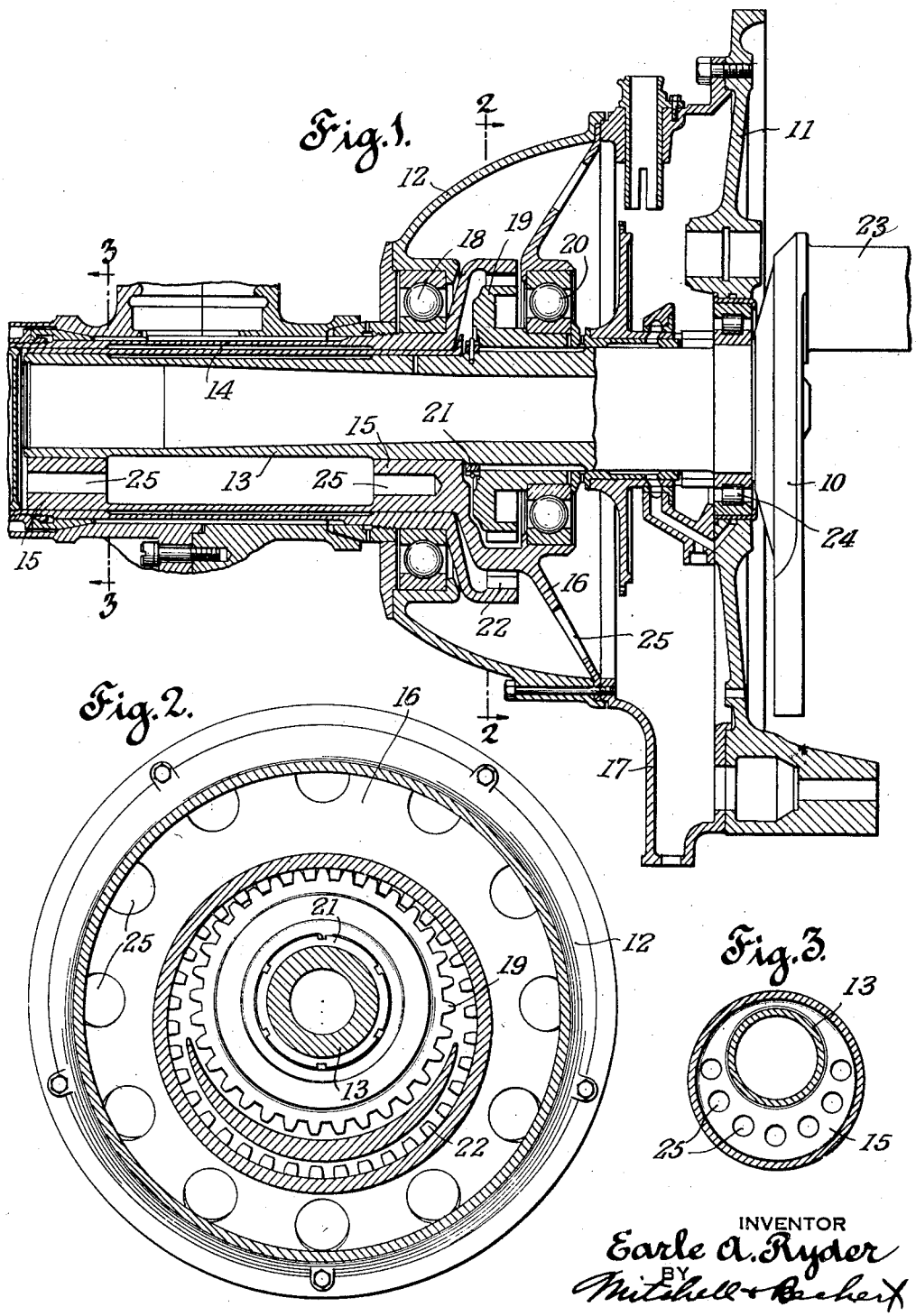

1,836,555

UNITED STATES PATENT OFFICE

EARLE A. RYDER, OF WEST HARTFORD, CONNECTICUT, ASSIGNOR TO THE PRATT & WHITNEY AIRCRAFT CO., OF HARTFORD, CONNECTICUT, A CORPORATION OF DELAWARE

SPEED CHANGE DEVICE

Application filed November 21, 1928. Serial No. 320,977.

This invention relates to speed change devices, and in particular to a gear type speed reduction unit disposed between an aircraft engine and its propeller.

A primary object of the invention is to provide a gear reduction unit between the crank-shaft and propeller hub of an aircraft engine which will be simple in construction, light in weight, have few parts, and which will be efficient in operation.

An important feature of the invention is to provide an extended portion on the crank-shaft surrounded by a sleeve, the crank-shaft and sleeve having intermeshing gears thereon, and to provide supporting means for these two members which is adapted to support them accurately and rigidly in proper relative position.

Another object of the invention is to provide a bearing for the extended portion of the crankshaft and the sleeve to which the propeller hub is attached adapted for supporting these members rotatably relatively to each other upon parallel axes.

A further object of the invention is to provide a gear on an intermediate portion of the extended crank-shaft meshing with another gear preferably of the internal type on the inner end of the driven sleeve surrounding the crank-shaft so that the sleeve may be driven at a different speed from the crank-shaft substantially silently and with a minimum of additional weight and space being required.

A still further object of the invention is to rotatably support a crank-shaft and sleeve forming parts of a speed change device applied to an aircraft engine, preferably by spaced antifriction bearings the inner rings thereof respectively engaging the hub of the driving gear and the sleeve adjacent the driven gear, the outer rings of these bearings being supported within members of the engine frame within which the crank-shaft and sleeve are mounted.

With the above and other objects in view my invention includes the features of construction and operation set forth in the following specification and illustrated in the accompanying drawings.

In the drawings—

Fig. 1 is a longitudinal sectional view through the propeller end of an aircraft engine showing my improved form of speed reducing device applied thereto;

Fig. 2 is a transverse sectional view taken upon the plane of line 2—2 of Fig. 1; and Fig. 3 is a similar sectional view taken upon the plane of line 3—3 of Fig. 1.

In the above mentioned drawings I have shown but one embodiment of my invention applied to an aircraft engine, but it will be understood that the invention can be otherwise embodied and that the drawings are not to be construed as defining or limiting the scope of the invention, the claims appended to this specification being relied upon for that purpose.

In aircraft power units it is frequently desirable to operate the engine at one speed and the propeller at another speed. Usually the engine is driven at its highest efficient speed to develop maximum power, and the propeller is driven at a reduced speed relative to the engine in order to use the propeller at its maximum efficiency. One engine may be used in a large variety of aircraft requiring for their efficient operation propellers of widely different characteristics. This calls for a large number of different speed ratios between the engine crank-shaft and its propeller depending upon the particular propeller with which the engine is used. The present invention relates more particularly therefore to a reducing unit adapted to be interposed between the crank-shaft of an aircraft engine and the propeller hub thereof which will permit a wide selection in the members so that the unit may be designed for any one of a large number of ratios.

Referring more in particular to the figures of the drawings, the forward or propeller end of a crank-shaft 10 is shown rotatably mounted within a portion of the engine housing forming the crank case 11. This driving shaft 10 for the propeller (not shown) is extended forwardly so that it extends completely through the front housing 12 of the engine frame. Surrounding the forward portions 13 of the crank or driving shaft 10 of the engine is a sleeve 14 mounted rotatably over the driving shaft upon a supporting member 15. This supporting member 15 is interposed between the outer surface of the forward portions 13 of the driving shaft 10 and the inner cylindrical surface of the driven shaft or sleeve 14. This support 15 for the sleeve 14 surrounding the driving shaft is preferably made integral with a flanged member 16 bolted at its periphery to one of the housing members 17 of the frame. As shown clearly in Fig. 1 the front end of the crank case 11, the member 17 forming part of the engine frame and the front closure member 12 are all securely bolted together. The flange member 16 forming a portion of the supporting member 15 is bolted, preferably as shown, between the members 17 and 12. In this manner the supporting member 15 is held rigidly in position and aids in supporting the extended portions 13 of crank shaft 10. The sleeve or driven shaft 14 is supported rotatably upon outer cylindrical bearing surfaces formed on the supporting member 15.

Mounted upon the outer cylindrical portion of the driven sleeve 14 adjacent its rear end is an antifriction bearing 18 the inner ring of which engages the sleeve 14 and the outer ring engages an internal surface in the surrounding housing member 12. The sleeve 14 therefore is rotatably supported upon and is guided by the bearing member 15 between itself and the driving shaft 13. In addition it is further supported adjacent its rear end with relation to the housing member 12 by the antifriction bearing 18.

Mounted on an intermediate part of the driving shaft 13 is a driving gear 19, the hub portion of which is splined for engagement with corresponding splines in the shaft 13 and is extended on one side to form a bearing or seat for the inner ring of an antifriction bearing 20. The outer ring of this bearing 20 engages the flanged portion 16 of the supporting member 15. The driving gear 19 is retained in axial position upon the shaft 13 by means of a collar 21 threaded upon the shaft 13 in advance of the gear 19 and pinned in adjusted position.

The rear end of the sleeve 14 is enlarged in diameter as indicated clearly in Fig. 1 and is provided at its inner end with an internal gear 22. This internal gear 22 meshes directly with the teeth of the gear 19 on the driving shaft 13 which is of the spur type. As is shown clearly in Fig. 2, the axes of the driving shaft 13 and the driven sleeve 14 are parallel and are disposed in a common vertical plane, the axis of the driven sleeve 14 being a material distance from and preferably below that of the driving shaft 13. The gears 19 and 22 therefore will mesh, in the embodiment of the invention illustrated in Fig. 2, above the axes of its shaft 13 and sleeve 14 and a crescent shaped opening will be formed between the gears 19 and 22 below these axes. Through this crescent shape opening the supporting member 15 disposed between the driving shaft 13 and driven sleeve 14 extends to its rear flanged portion 16.

By varying the ratio between the spur and internal gears 19 and 22 the propeller sleeve 14 may be driven at any one predetermined ratio relative to the speed of the crank-shaft 10. By substituting different gears 19 and 22, sleeves 14 and supporting members 15 the construction may be adapted for any predetermined speed ratio between relatively wide limits. Furthermore, by removal of the sleeve member 15 and substituting a new frame member 12 and bearing 18 to take the place of the frame member and bearing shown in the drawings a propeller may be mounted directly upon the forward end of the driving shaft 13.

The driving shaft 13, as will be seen by reference to Fig. 1, is supported adjacent and directly in front of the crank 23 by the usual bearing 24 preferably of the antifriction type contacting with a surface of the crank case 11, and will be further supported by an antifriction bearing 20, the inner ring of which engages the hub of the gear 19 secured upon this driving shaft 13. Furthermore, the driving shaft 13 will be supported by means of the antifriction bearing 18 mounted upon the rear end of the driven sleeve 14 acting through the bearing 15 between the shaft 13 and sleeve 14. The outer or free end of the driving shaft 13 will be directly supported by the intermediate supporting member 15 which forms a plain bearing both for the driving shaft 13 and the driven sleeve 14. The driving shaft 13 and sleeve 14 therefore materially support each other through the supporting member 15 extending between them. The bearing surfaces on this supporting member are spaced apart, the intermediate portions being suitably recessed. In order to reduce the weight of the supporting member 15, holes 25 may be bored and recesses formed therein in various portions of this member 15 and its flanged portion 16.

I claim:

1. A speed change device comprising in combination, an engine frame, a driving shaft therein extending through said frame, a driving gear on an intermediate portion of said driving shaft, a driven shaft in the form of a sleeve surrounding said driving shaft, a bearing mounted on the hub of said driving gear and engaging said frame, a bearing engaging said frame and supporting one end of said sleeve, and supporting means for said driving and driven shafts disposed between said shafts.

2. A speed change device comprising in combination, an engine frame, a driving shaft therein extending forwardly through said frame, a driving gear on an intermediate portion of said driving shaft, a driven shaft in the form of a sleeve eccentrically surrounding said driving shaft, a bearing between said driving shaft and frame, a bearing between said driven shaft and frame, and a supporting member having bearing portions for said driving and driven shafts disposed between said shafts.

3. A speed change device comprising in combination, an engine frame, a driving shaft therein extending completely through said frame, a driving gear on an intermediate portion of said driving shaft, a driven shaft in the form of a sleeve eccentrically surrounding and with its axis parallel to said driving shaft, a bearing between said driving shaft and frame, a bearing between said driven shaft and frame, a bearing between a portion of said driving gear and said frame, and a bearing disposed between said driving shaft and said driven shafts.

4. A speed change device comprising in combination, an engine frame, a driving shaft therein extending through said frame, a driving gear on an intermediate portion of said driving shaft, a driven shaft in the form of a sleeve eccentrically surrounding and with its axis parallel to said driving shaft, a bearing between said driving shaft and frame, a bearing between said driven shaft and frame, a supporting member disposed between said shafts, and spaced bearing portions on said driving and driven shafts engaging said supporting member.

5. A speed change device comprising in combination, an engine frame, a driving shaft therein extending through said frame, a driving gear on an intermediate portion of said driving shaft, a driven shaft in the form of a sleeve eccentrically surrounding and with its axis parallel to said driving shaft bearings for said driving and driven shafts rotatably supporting said shafts relative to said frame, and a supporting member disposed between said driving and driven shafts, said supporting member extending between the space between said gears and being attached at its rear end to said frame.

6. A speed change device comprising in combination, an engine frame, a driving shaft therein extending through said frame, a driving gear on an intermediate portion of said driving shaft, a driven shaft in the form of a sleeve surrounding said shaft, a bearing for said driving and driven shafts rotatably supporting said shafts relative to the frame, a supporting member surrounding said driving shaft and enclosed by said driven shaft having bearing surfaces engaged by said driving and driven shafts, and means to hold said supporting member in rigid position relative to said frame.

7. A speed reducing device comprising in combination, an engine frame, a driving shaft therein, a driving gear on an intermediate portion thereof, a driven shaft in the form of a sleeve surrounding a portion of said driving shaft, a gear thereon in mesh with said driving gear, a bearing between said driving shaft and said frame, a bearing between said frame and one end of said sleeve, and supporting means for the extended portions of said driving and driven shafts disposed between said shafts.

8. A speed reducing device comprising in combination, an engine frame, a driving shaft therein, a driving gear on an intermediate portion thereof, a driven shaft in the form of a sleeve surrounding a portion of said driving shaft, a gear thereon in mesh with said driving gear, a bearing between said driving shaft and said frame, a bearing between said frame and one end of said sleeve, and supporting means for the extended portion of said driving shaft and for said driven shaft disposed between said shafts and attached at its rear end to said frame.

9. A speed reducing device comprising in combination, an engine frame, a driving shaft therein, a driving gear on an intermediate portion thereof, a driven shaft in the form of a sleeve surrounding a portion of said driving shaft, an internal gear thereon in mesh with said driving gear, a bearing between said driving shaft and said frame, a bearing between said frame and one of said sleeves, and supporting means for the extended portions of said driving and driven shafts disposed between said shafts, said supporting means extending through the space between said gears and having a flange at its rear end attached at its periphery to said frame.

10. A speed change device comprising in combination a plurality of members rigidly secured together to form a support, a driving shaft rotatably mounted within said support, a gear provided with a hub extension on said shaft, a bearing between the said extension and one of said members, a driven shaft mounted within said support and having a gear thereon in mesh with said driving gear, a bearing supporting one end of said driven shaft, and means between said driven shaft and an extension of said driving shaft for supporting said driven shaft.

EARLE A. RYDER.